US005501372A

United States Patent [19]

Daansen

[11] Patent Number: 5,501,372

[45] Date of Patent: Mar. 26, 1996

[54] PUMP TIP FOR FLUID DISPENSER

[76] Inventor: Warren S. Daansen, P.O. Box 614, Nashua, N.H. 03061

[21] Appl. No.: 357,392

[22] Filed: Dec. 16, 1994

Related U.S. Application Data

[63] Continuation-in-part of Ser. No. 23,628, May 27, 1994.

[51] Int. Cl.$^6$ .................... B67D 5/06; G01F 11/02

[52] U.S. Cl. .................... 222/207; 222/181.3; 222/214

[58] Field of Search .................... 222/181, 207, 222/214, 185.3, 105

[56] References Cited

U.S. PATENT DOCUMENTS

| | | | |
|---|---|---|---|
| 4,130,224 | 12/1978 | Norman et al. | 222/214 X |
| 4,394,938 | 7/1983 | Frassanito | 222/214 X |
| 4,607,764 | 8/1986 | Christine | 222/207 |
| 4,621,749 | 11/1986 | Kanfer | 222/181 X |
| 4,667,854 | 5/1987 | McDermott et al. | 222/214 X |
| 4,895,276 | 1/1990 | Maldonado | 222/214 X |
| 5,105,992 | 4/1992 | Fender et al. | 222/214 X |
| 5,242,083 | 9/1993 | Christine et al. | 222/214 X |
| 5,248,066 | 9/1993 | Olson et al. | 222/181 X |
| 5,265,772 | 11/1993 | Bartasevich et al. | 222/181 X |

*Primary Examiner*—Kevin P. Shaver

*Attorney, Agent, or Firm*—Vernon C. Maine

[57] ABSTRACT

An improved pump tip for a fluid dispenser system using a pump tube, such as common hand soap dispensers, the improvement being a longer pump tip with a longitudinally-extended exterior surface that works with a correspondingly shorter pump tube. The longer exterior surface enables the pump tip to be installed directly into the lower tube locator recess of existing dispensers in close fit and direct contact with the vertical structural wall of the recess, thereby providing a pump tube lower end termination with improved security, rigidity and lateral support of the tip and tube, greater security for the exposed pump tip nozzle, and enabling use of shorter pump tubes of larger diameter without need for a necked-down lower end.

3 Claims, 6 Drawing Sheets

PUMP TIP FOR FLUID DISPENSER

This application is a continuation-in-part to pending Design application Ser. No. 29/023,628, file date May 27, 1994, group art 2900, by the same inventor.

BACKGROUND OF INVENTION

1. Field of Invention

The present invention relates to fluid dispensers; particularly to fluid dispenser systems that use internal fluid containers having a collapsible, resilient, pump tube through which the fluid is dispensed; more particularly to dispenser systems having a pump tip at the end of the pump tube which restricts the flow of fluid between dispenses and regulates or directs the flow of fluid during dispenses, and most particularly to wall-mounted liquid soap dispensers using disposable soap containers known in the industry as "bag-in-a box" containers.

2. Description of Prior Art

The prior art of metered dispensing of single-use portions of fluids from dispensers using some sort of disposable, collapsible tube to which pressure is applied for flow control, is voluminous. The most significant benefit of this methodology is that the subject fluid never comes into direct contact with valves or pumps of conventional plumbing. Liquids and semi-liquids such as food materials, medicines, and cleaning materials are commonly dispensed from countless numbers of existing such dispensers in use around the world. New dispensers are being added to existing markets and new markets constantly.

Wall-mounted liquid soap dispensers which dispense small portions of detergent upon application of pressure to a dispensing arm or member are commonly found in business, industry and institutional restrooms, and constitute a significant specialty industry. The installed base of soap dispensers in the United States alone is estimated to exceed one million. Many of these still use a fixed reservoir which is refilled as required, but the industry trend is overwhelming in favor of dispensers that use sealed, disposable containers of soap having integral pump tubes and tips. The improvements in ease of service, maintenance and improved sanitation are compelling reasons to do so.

However, little of the published art focuses on the subject of the manual metering or pumping mechanism within the dispensers, particularly on the pump tip on the end of the pump tube operated in the most common dispensers. The pump tip performs several important functions; it has a nozzle to dispense the soap in the right direction, it opens on demand to dispense a metered portion of soap, and it closes off the flow of soap between dispenses.

The pump tips of the prior art are substantially supported within and by the pump tube, the lower end of the tube when installed being nested in a recess in the back plate of the dispenser. Some pump tips and nozzles are totally unsupported, otherwise, and are susceptible to movement in any direction, caused by movement of the pump tube. This can lead to misdirected dispenses, jams, and leaks.

Some pump tips have keyed surfaces that extend from below the lower edge of the pump tube to mate with corresponding surfaces in the lower end of the tube recess of compatible dispensers. The keyed surfaces act primarily to restrict the degree of cross-brand compatibility of soap containers to dispensers, but may contribute to some degree to prevent pump tubes and tips from being twisted or drawn up into the dispenser as the pump tube is manipulated by the pumping mechanism.

The "bag-in-a-box" containers hold the liquid soap or other desired material, in a collapsible, flexible bag within a cardboard or paperboard box which is closed for shipping and storage. The box is installed on a shelf in the dispenser, opened for use by tearing out a perforated section in the front and bottom of the box which leaves a slot through which the collapsible pump tube connected to the bottom of the bag is extracted and positioned in it's respective upper and lower tube locator recesses. The tube may be attached to the bag by a rotatable fitment which allows the tube and tip to be rotated as necessary to mate any keyed surfaces on the tip to the corresponding surfaces in the lower tube recess.

The pump tube is typically made of extruded or molded latex or similar material, and is typically two to four inches long, depending on the dispensers it is intended to fit. The pump tube is attached to or terminated by the pump tip and nozzle from which the fluid is dispensed.

Within the pump tip is a check valve that resists the free flow of fluid from the bag, but which will yield to the fluid pressure created by a manually-actuated pumping mechanism which squeezes the pump tube in a downward direction.

The pump lever actually pinches off the tube closer to the upper end, then squeezes the tube progressively downward to expel the trapped fluid through the pump tip. When the pressure on the tube is removed, the lower end check valve shuts, and the tube expands to its full size. It is the expansion of the pump tube after the dispense that draws more fluid from the bag into the tube, collapsing the bag by a proportionate volume.

The system is sized so that one or two strokes of the pump lever should dispense a sufficient volume of soap for the average user's immediate use.

The check valve may be incorporated into the lower end of the pump tube, rather than actually in the pump tip. Also, some designs include a second check valve on the upper end of the pump tube to prevent back flow of fluid into the bag during the pressure stroke on the pump tube.

In some systems the volume requirement necessitates a larger diameter pump tube than the dispenser's lower recess provides for. Some manufacturers use a molded-in necked-down lower end tube design to provide the desired working volume and still properly fit the tube recess. This necked-down feature creates a complex pump tube design that is inevitably more expensive to manufacture than simple, extruded pump hose that could be cut to length.

A dispenser cover opens to expose the interior of the dispenser for changing soap containers. The box of soap is placed on a supporting shelf in the upper part of the dispenser, and the pump tube is extended downward through a slot in the shelf and typically positioned into an upper pump tube recess and a lower pump tube recess with the working portion of the pump tube lying against a back plate or support wall of the dispenser.

The dispenser cover, when closed, positions a lever or pump arm or related pressure member in close proximity to the pump tube so that upon actuation, the pressure member squeezes the tube against the support wall in a downward direction, thus forcing a portion of the fluid in the tube through the pump tip and out the nozzle. The tube recovers it's shape when the lever is relaxed, allowing the tube's interior volume to be replenished with fluid from the bag.

It is important to reiterate that the known pump tube/tip designs universally extend the tubing into a lower tube recess as the primary means of providing lateral support to the pump tube during operation in the dispenser. Conversely, the lower tube locator recesses of known soap dispensers are universally designed with the outer diameter of the lower end of the intended pump tube as the size of the recess, clearly intending that the principle means of laterally securing the low end of the pump tube be by virtue of it's external contact with the walls of the recess, and thereby relegating the pump tip to the less rigid support provided by the interior walls of the pump tube.

This design standard has resulted in the problem of a lack of rigidity and structural integrity of the lower termination point of the pump hose, and the further problem that the pump tip and nozzle are not fully supported, secured or laterally restrained by dispenser structure, and may be twisted or misdirected by flexing of the pump tube in operations, or by external means such as user's hands or fingers, causing fluid to be dispensed in an unexpected direction, or possible malfunction or leakage of the dispenser.

Furthermore, in common dispensers there is no structural means provided for closing or fully securing the pump tip against forward movement within the lower pump tube recess, thus not excluding the possibility that a pump tip will become dislodged or misaligned during cover closure or operation, causing a malfunction, rupture, or related problem.

U.S. Pat. No. 5,265,772, Bartasevich, Nov. 30, 1993, discloses a typical dispenser system that uses a "bag-in-a-box" disposable container. The illustrations clearly show the reliance on a pump tip and tube combination whereby the outer diameter of the soft wall of the pump tube extends downward into the lower tube recess and provides the majority of contacting surface for lateral restraint of the tube in operation.

The pump tips and tubes of FIGS. 8A, 8B and 8C of this specification illustrate examples of the prior art of pump tip designs that presume pump tubes to extend into the lower recess of a common dispenser, the vertical height of the recess being the excess tube length illustrated in FIGS. 8A–8D by length L. FIGS. 1, 2 and 6 further illustrate a typical dispenser loaded with a fluid container with a pump tube and tip of the prior art wherein the tube extends into the lower tube recess and provides only a soft contact surface for lateral support.

In summary, the box, bag, pump tube and pump tip portion of typical dispensing systems, in the present practice and direction the industry is heading, are disposable and consequently very price sensitive. Therefore subtle improvements that will lower unit costs of the disposable package by small fractions of a cent, when multiplied by the total market, become very important. Also, the large installed base of dispensers means that improvements to the disposable portion of the hardware that will work with the existing installed dispensers will reach and benefit more users far faster than improvements to the dispenser. Finally, the present scheme of pump tubes and tips is not the product of a clean design, but simply the present state of an evolving industry. The pump tubes and tips of the prior art, supported mainly by the exterior walls of the excess length of the soft latex pump tube wall have been known to become disengaged, to rupture, and to misdirect the dispensed materials. Also, as always, the cost of disposable hardware is an issue.

SUMMARY OF THE INVENTION

The invention in it's simplest form is an improved pump tip for fluid dispenser systems using pump tubes, such as common hand soap dispensers, the improvement being a longer pump tip body with a vertical exterior surface that conforms in cross section to the lower tube locator recess of the dispenser, and allows for a correspondingly shorter pump tube the diameter of which is then independent of the size of the tube recess. The improvement provides a more rigid nozzle mounting, and a pump tube termination with a hard interface, close fit, improved security, rigidity and lateral support for the tip and tube, greater security for the exposed pump tip nozzle, and less likelihood of a dislocated nozzle, tip and pump tube, with subsequent leakage or malfunction, during installation, use, or resulting from miss use. It further enables the use of shorter pump tubes of larger diameter without need for a necked-down lower end.

It will be apparent to one skilled in the art that the objects of the invention extend to variations of pump tube and pump tip applications beyond the bag-in-a-box soap and wall-mounted soap dispenser described in detail elsewhere in this disclosure.

An object of the invention is to provide an improved pump tip for use with a dispenser with a pump tube connected to the bottom its fluid vessel so that the fluid in the vessel flows freely into the tube as it expands after a pressure stroke. The pump tip is commonly installed within the lower end of the pump tube, and may incorporate a means for resisting the free flow of fluid while permitting or opening the flow when a pump mechanism or lever incorporated into the dispenser strokes the pump tube, thereby dispensing a portion of the fluid through the tip nozzle.

A hard interface between the pump tip and recess would insure that the tip is rigidly held in place and provide better lateral support to both the pump tube and the tip nozzle, during installation and operation of the dispenser, than if the soft exterior wall of the tube itself was the point of primary lateral support. To this end, the improved pump tip may have an extended external vertical mating or mounting surface that is directly engagable or can be inserted or connected directly to a lower pump tube locator recess or other mounting point in the dispenser that would ordinarily grip or hold the soft exterior wall of the lower end of the pump tube.

Another object of the invention is to provide resistance to unwanted twisting of the tip and tube, or upward creeping or movement caused by the elasticity or working of the soft wall of the pump tube in operation. To this end, the improved pump tip may have keyed surfaces that are intended to correspond to mating surfaces in the wall or structure of the lower tube locator recess.

Yet another object of the invention is to contribute further to reduced twisting and upward movement of the pump tube, tip and nozzle. To this end the improved pump tip may have a generally cylindrical or round shape matching that of the recess, and have one or more protruding tabs corresponding to slots in the wall or structure of the recess and one or more stepped surfaces on the body of the pump tip corresponding to stepped surfaces on or in the wall or structure of the recess.

Still yet another object of the invention is to provide a means by which the flow of fluid is regulated. To this end the improved pump tip may incorporate a spring and ball check valve.

A further object of the invention is to provide for the spring and ball check valve or other flow regulation means to be inserted or installed within the pump tip. To this end the improved pump tip may be designed and fabricated in component parts for assembly into final form.

A yet further object of the invention is that it be disposable after a limited use, rather than recycled or reused as might otherwise be the case. To this end, the improved pump tip is designed for low material content, material cost and assembly cost, as well as performance.

A still yet further object of the invention is to incorporate the improved pump tip with a fluid container for use in a fluid dispenser. To this end the improved tip may be connected or attached to the lower end of a pump tube and hence to a collapsible, watertight bag of fluid secured within a box that provides protection to the bag and contents, and a fixed form for shipping, storage and installation.

An additional object of the invention is to incorporate the improved pump tip into a fluid dispenser system as illustrated, defined and explained throughout this disclosure.

DESCRIPTION OF PREFERRED EMBODIMENT

Figure 1:
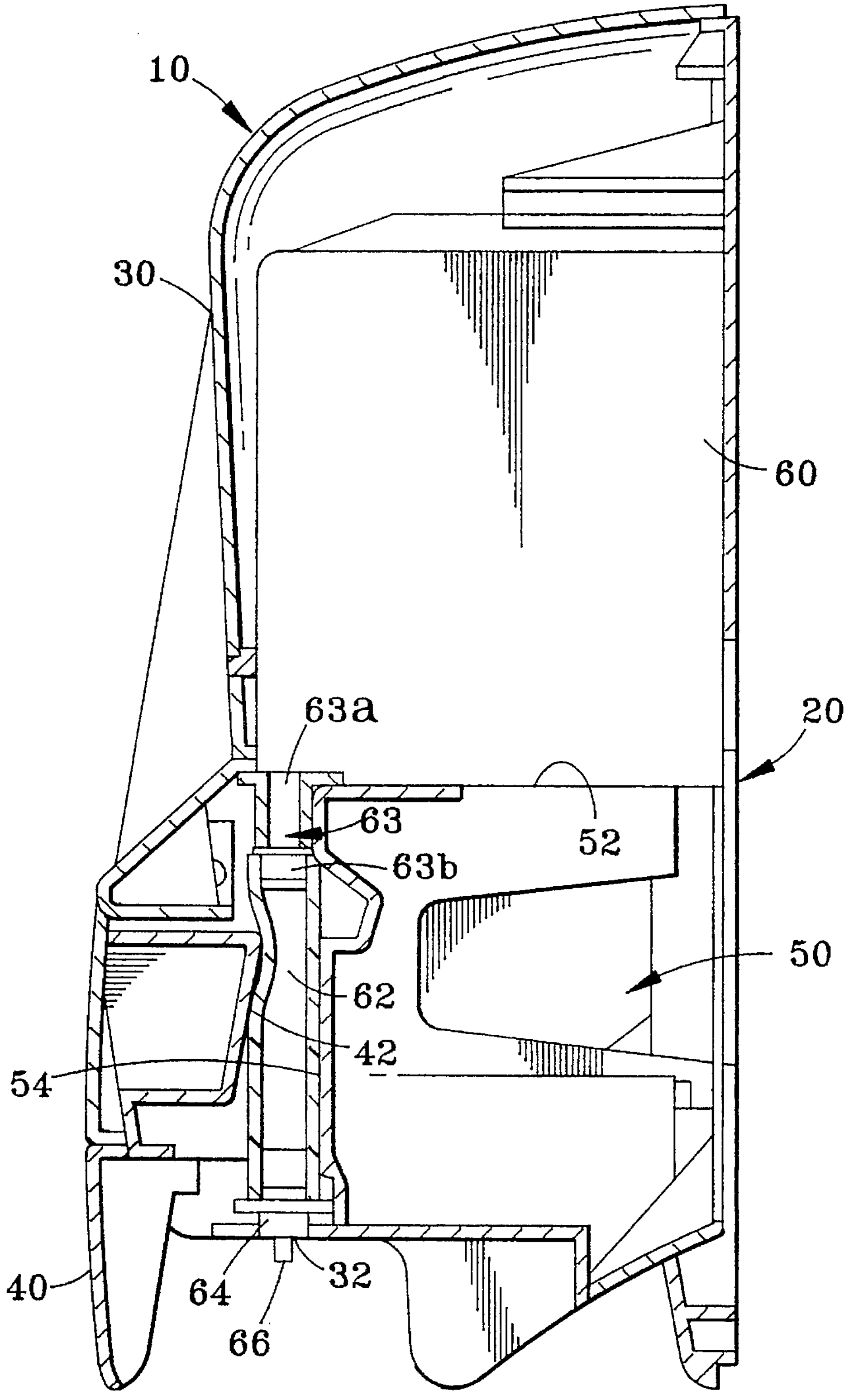
FIG. 1 PRIOR ART
FIG. 1 is a sectional view of a typical liquid hand soap dispenser with pump tube and prior art pump tip.

The preferred embodiment of the invention is an improved pump tip for fluid dispenser systems using pump tubes, such as common hand soap dispensers, the improvement being a longer pump tip with a longitudinally-extended exterior surface that works with a correspondingly shorter pump tube. The longer exterior surface enables the pump tip to be installed directly into the lower tube locator recess of the dispenser in close fit and direct contact with the vertical structural wall of the recess, thereby providing a pump tube LOWER END termination with improved security, rigidity and lateral support for the tip and tube, greater security for the exposed pump tip nozzle, and enabling the use of shorter pump tubes of larger diameter without need for a necked-down lower end.

It will be apparent to one skilled in the art that the invention extends to variations of pump tube and pump tip applications beyond the bag-in-a-box soap and wall-mounted dispenser described in detail in this section.

For example, the invention extends to an improved pump tip for use with a pump tube connected to the bottom any fluid vessel so that the fluid in the vessel flows freely into the tube as it expands after a pressure stroke. The pump tip is commonly installed within the lower end of the pump tube, and may have a means for resisting the free flow of fluid but permitting or opening the flow when a pump mechanism or lever incorporated into the dispenser strokes the pump tube, thereby dispensing a portion of the fluid through the tip nozzle.

The improved pump tip may have an extended external vertical mating or mounting surface that is directly engagable or can be inserted or connected directly to a lower pump tube locator recess or other mounting point in the dispenser that would ordinarily grip or hold the soft exterior wall of the lower end of the pump tube. The hard interface between the pump tip and recess insures that the tip is rigidly held in place and provides better lateral support to both the pump tube and the tip nozzle, during installation and operation of the dispenser, than if the soft exterior wall of the tube itself was the point of primary lateral support.

As another example, the invention extends to an improved pump tip with keyed surfaces that are intended to correspond to mating surfaces in the wall or structure of the lower tube locator recess, and may provide resistance to unwanted twisting of the tip and tube, or upward creeping or movement caused by the elasticity or working of the soft wall of the pump tube in operation.

As yet another example, the invention extends to an improved pump tip with a generally cylindrical or round shape matching that of the recess, and having one or more protruding tabs corresponding to slots in the wall or structure of the recess and one or more stepped surfaces on the body of the pump tip corresponding to stepped surfaces on or in the wall or structure of the recess, which may again contribute to reduced twisting and upward movement.

As still yet another example, the invention extends to an improved pump tip incorporating a spring and ball check valve as the means by which the flow of fluid is regulated.

As a further example, the invention extends to an improved pump tip designed and fabricated in component parts so that the spring and ball check valve or other flow regulation means can be inserted or installed within the pump tip before or as the parts are assembled into final form.

As a yet further example, the invention extends to an improved pump tip intended to be disposable after a limited use, such as when incorporated with a bag-in-a-box disposable soap container, rather than recycled or reused as might otherwise be the case.

As a still yet further example, the invention extends to a fluid container incorporating the improved pump tip, for use in fluid dispensers, which container may consist of a collapsible, watertight bag of liquid soap or other product, the bag made of plastic or similar material and secured within a box that provides protection and a fixed form to the container for shipping, storage and installation in dispensers. The fluid container would include a pump tube connected to the lower end of the bag and the improved pump tip connected to the lower end of the tube.

As an additional example, the invention extends to fluid dispenser systems including soap dispensers that use or incorporate the improved pump tip or use a fluid container incorporating the improved pump tip as described and illustrated in this disclosure.

Figure 2:
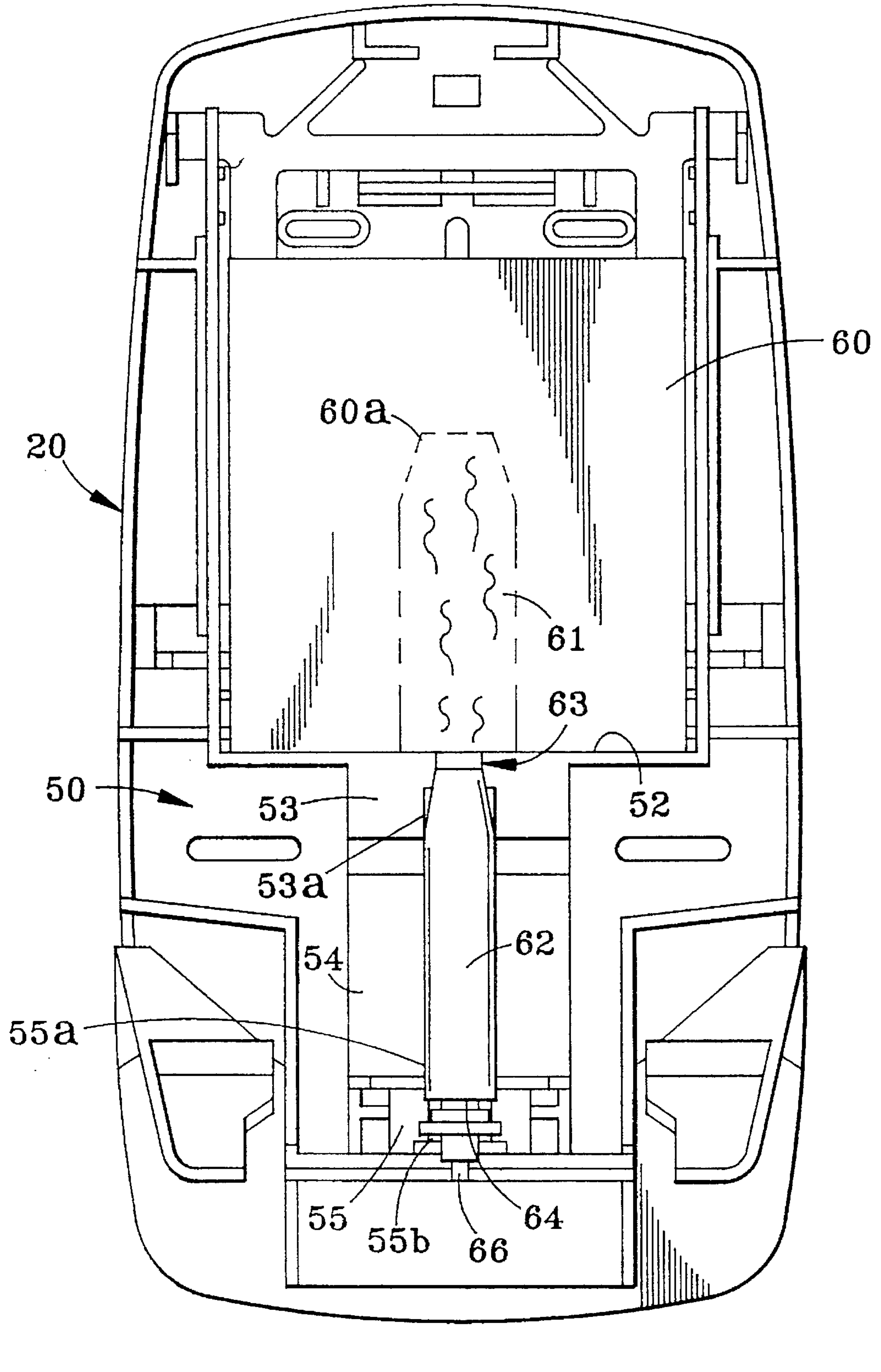
FIG. 2 PRIOR ART
FIG. 2 is a front elevational view of the dispenser with the cover removed.
Figure 6:
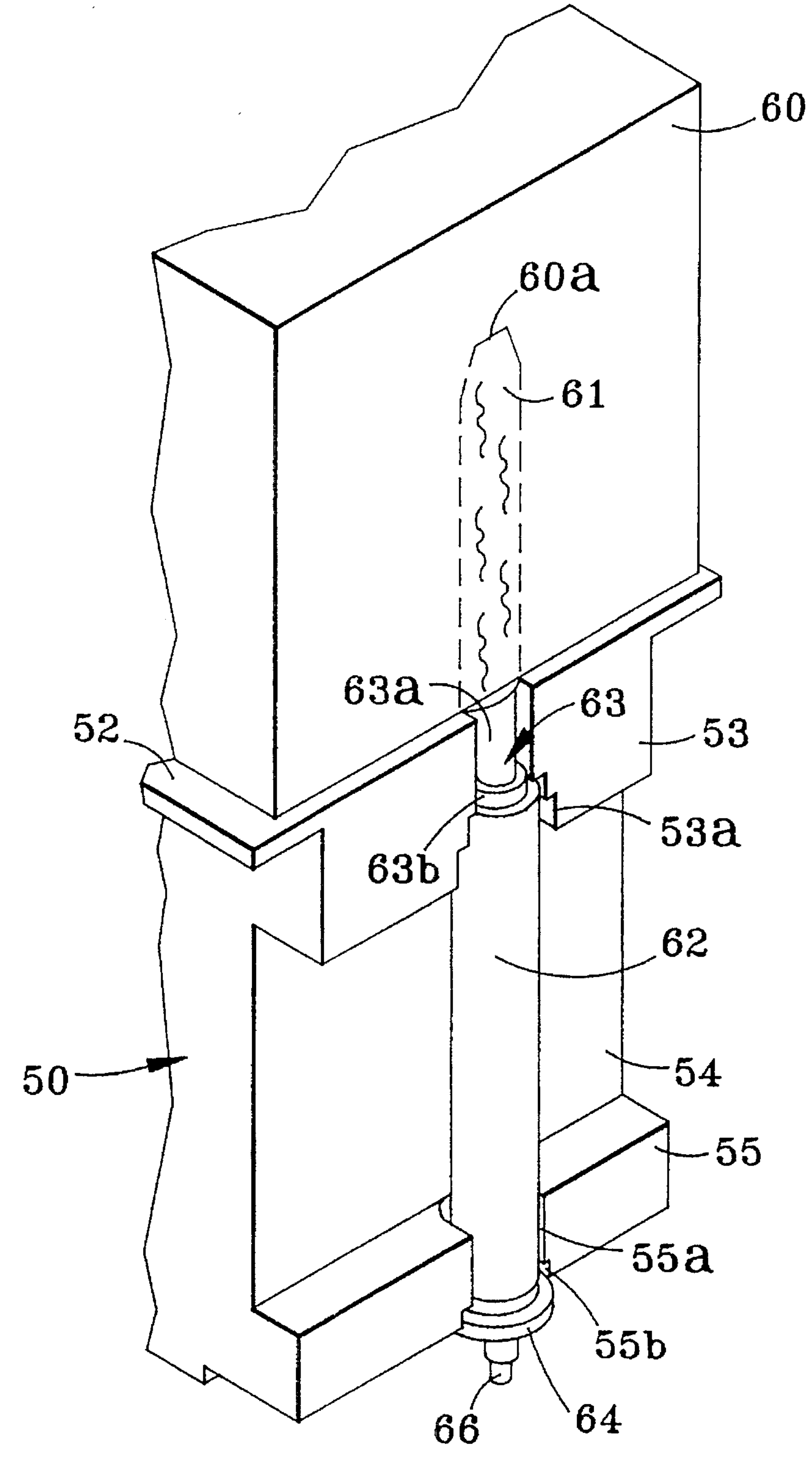
FIG. 6 PRIOR ART
FIG. 6 is a perspective view of a prior art pump tip installed in a typical dispenser.

Referring first to FIGS. 1, 2, and 6 of the drawings for context, it will be seen that a typical liquid hand soap dispenser 10 generally includes a back plate 20, a cover 30 and a pressure member 40; the pressure member 40 pivotally connected to the cover 30. The dispenser 10 holds therein a disposable fluid container 60 which contains liquid hand soap.

Figure 8A:
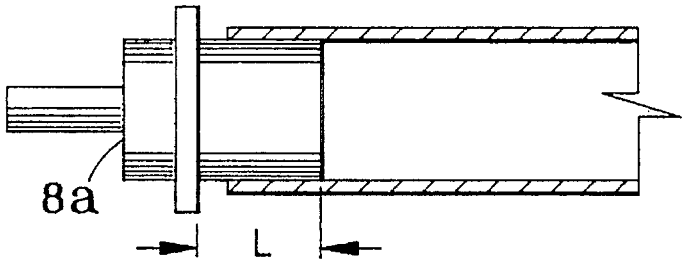
FIG. 8A PRIOR ART
FIGS. 8A–8C are prior art pump tips and FIG. 8D is a preferred embodiment of the pump tip of the instant invention.
Figure 8B:
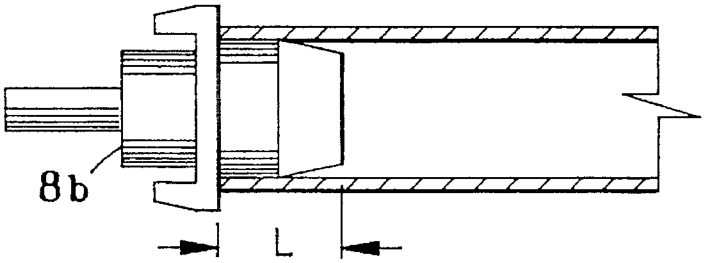
FIG. 8B PRIOR ART
Figure 8C:
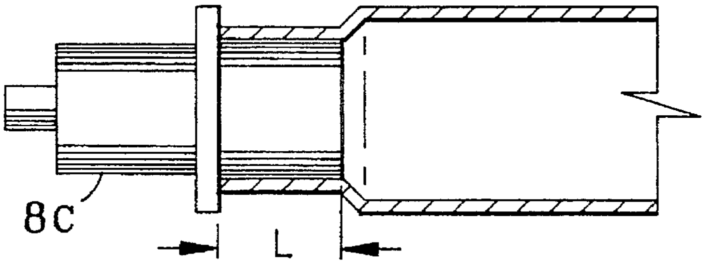
FIG. 8C PRIOR ART

The fluid container 60 is of the conventional "bag-in-box" construction and includes interiorly thereof a flexible, collapsible bag 61 which contains the liquid hand soap. A collapsible resilient pump tube 62, made of extruded or molded latex, extends from the bottom of the bag and has upper fitment 63 and prior art pump tip 64. Prior art pump tip 64 may be any variation of prior art pump tips **8*a*, 8*b*, and 8*c* of FIGS. 8A–8C where length L represents the portion of tube 62 normally engaged in lower pump tube locator recess 55***a*.

Upper fitment 63 is comprised of two pieces, a female coupling 63*a*, which is attached to the bag, and a male coupling 63*b*, which is attached to the tube. Male coupling 63*b* fits inside, and can rotate within, female coupling 63*a*, thereby connecting the tube 62 to the bag 61 while allowing the tube 62 to be rotated.

Prior art pump tip 64 may have a common spring and ball check valve therein, and has nozzle 66 on its bottom. Nozzle 66 projects through aperture 32 in cover 30 when tube 62 is properly positioned within closed dispenser 10. Tube 62 is normally stored within the box 60 during shipping and storage and a tear strip is provided in the box so that, when the box 60 is to be installed in the dispenser 10, the tear strip is simply removed along line 60*a* and the tube 62 extracted and the box and tube properly positioned in the dispenser.

A container and tube support member 50 projects outwardly from backplate 20, and includes support shelf 52. Container 60 rests on support shelf 52 with the tube depending therefrom. Support member 50 also includes a first vertical wall 53 and a second, recessed, vertical pressure support wall 54 extending downwardly from support shelf 52 and against which the tube 62 can be collapsed upon actuation of pressure member 40.

Extending outwardly from the bottom of support member 50 is a third vertical wall 55 lying in substantially the same vertical plane as the first vertical wall 53. First vertical wall 53 includes upper fitment locator recess 53*a* located just beneath the bottom support shelf 52 for receipt of upper fitment 63. Third vertical wall 55 includes lower pump tube locator recess 55*a* for receipt of tube 62 and prior art pump tip 64.

Referring to FIG. 1 of the drawings, it will be seen that the dispenser combination is fully loaded and the pressure member 40 is in the at rest position with pressure pad 42 engaging tube 62. By exerting pressure on pressure member 40 and moving it against tube 62, the tube 62 will be collapsed and the material contained therein will be dispensed out of nozzle 66.

Figure 3:
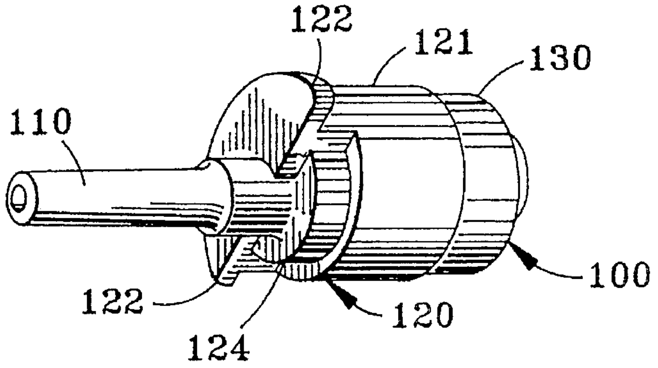
FIG. 3 is a perspective view of the preferred embodiment of the invention.
Figure 4:
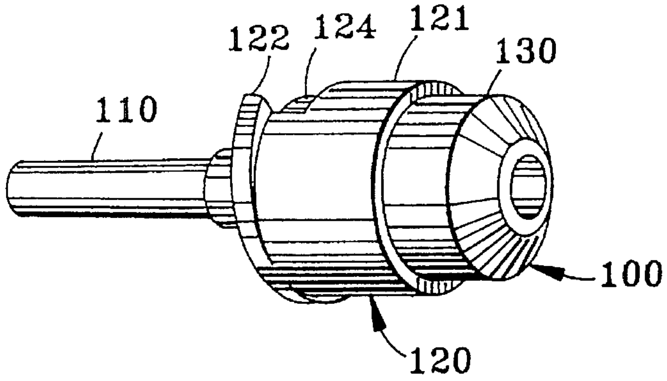
FIG. 4 is a second perspective view thereof.
Figure 7:
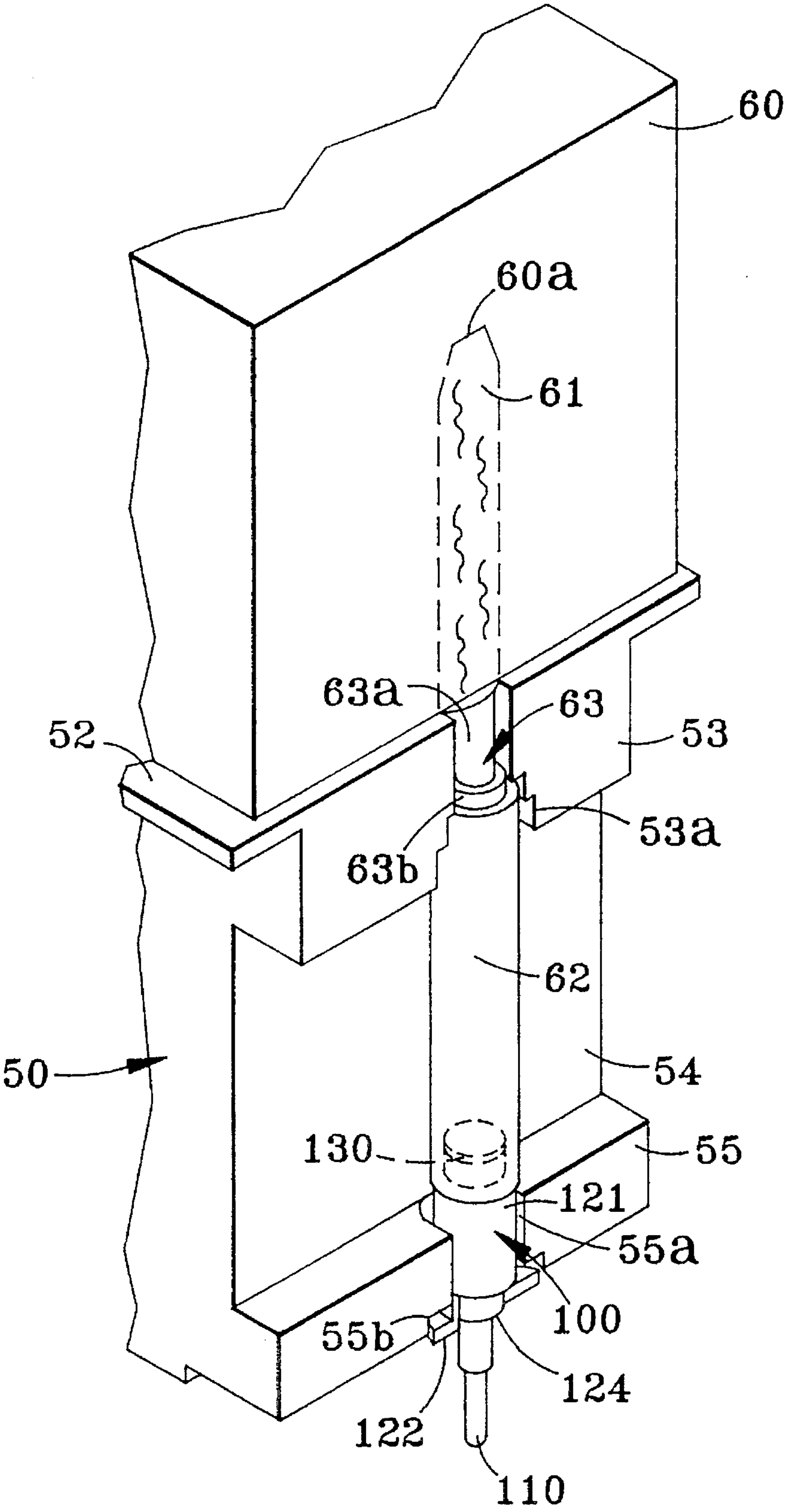
FIG. 7 is a perspective view of a preferred embodiment of the invention installed in a typical dispenser.
Figure 8D:
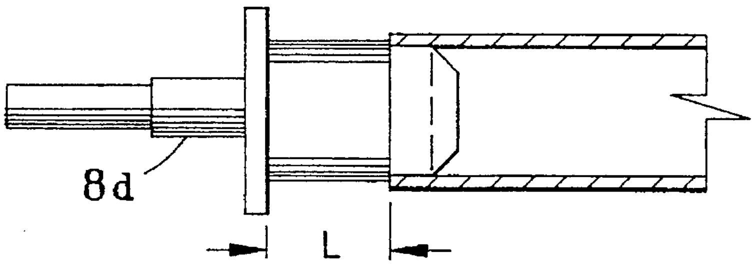

Referring to FIGS. 3, 4, and 8D of the drawings, it will be seen that improved pump tip 8*d* 100 has nozzle 110, body 120 and tube coupling 130. Body 120 has longitudinally-extended external mating surface 121 approximately equal or greater in length as the vertical height of lower pump tube locator recess 55*a*, which height is indicated as length L in FIGS. 8A–8D of the drawings. As shown in FIGS. 7 and 8D of the drawings, the lower end of pump tube 62 is attached to improved pump tip 100 via tube coupling 130, and is consequently shorter than the pump tubes of the prior art pump tips used in the same dispenser.

Referring to FIG. 7 of the drawings, external mating surface 121 of body 120 is directly engaged and closely-fitting in pump tip locator recess 55*a*, thereby providing a hard interface with accurate placement and resistance to lateral movement, and elevating tube coupling 130 and the lower termination of tube 62 above the upper edge of recess 55*a*. The diameter of tube 62 of FIG. 7 is not constrained by the diameter of recess 55*a*.

Referring to FIGS. 3, 4 and 7, body 120 has tabs 122 and step surface 124 which corresponds with slots and stepped surfaces 55*b* at the lower end of recess 55*a* as are common to many existing dispensers. Tube 62 may be rotated about upper fitment 63, to present opposing side keyed surfaces of body 120 for dispenses so configured.

Figure 5:
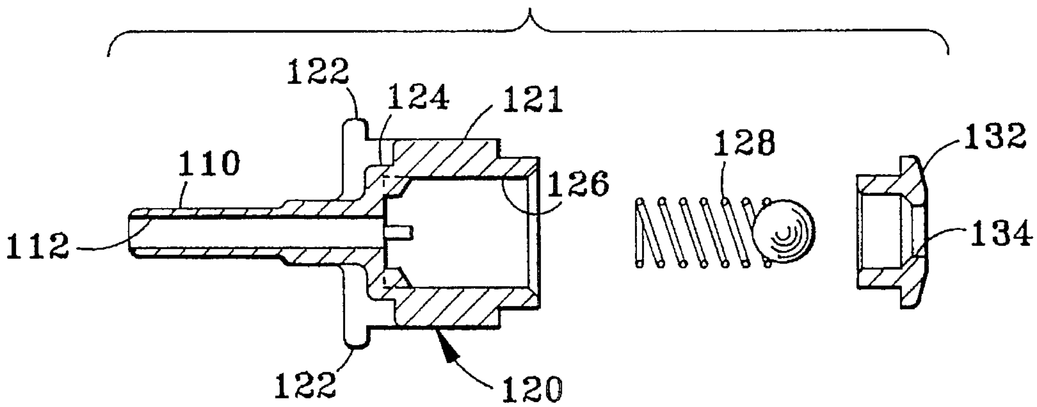
FIG. 5 is an exploded sectional view thereof.

Referring to FIG. 5 of the drawings, it will be seen that improved pump tip 100 may be assembled into final form as follows: ball and spring check valve 128 may be installed in a first component of improved pump tip 100 containing nozzle passage 112 and interior chamber 126, and end cap 132 having opening 134 may then be attached thereto.

It can be seen from FIGS. 1, 2, 6 and 7 that the method of operation of the dispenser is not altered by introduction of the improved pump tip of the invention. Spring and ball check valve 128 regulates the flow of fluid, normally resisting the free flow of fluid when the dispenser is not being used, and yielding to increased fluid pressure when pressure member 40 of the dispenser 10 is activated.

Although the drawings and the specification present a detailed disclosure of a preferred embodiment of the present invention, it is to be understood that the invention is not limited to the specific form disclosed, but covers all modifications, changes and alternative constructions falling within the scope of the claims in light of this disclosure.

What is claimed is:

1. An improved pump tip for use with a fluid vessel and pump tube in a fluid dispenser wherein said pump tube is connected to lower end of said fluid vessel such that fluid contained therein flows freely from said vessel into said pump tube, said pump tip comprising a body, a nozzle projecting downward from lower end of said body, and a tube coupling projecting upward from upper end of said body and attachable to lower end of said pump tube, said body containing an interior chamber, said chamber communicating with an output opening at lower end of said nozzle and further communicating with an input opening at upper end of said tube coupling whereby a continuous passage is formed through said pump tip, said body having at least one longitudinally-extending external mating surface, said mating surface directly engagable and closely fitting within a lower tube locator recess of said fluid dispenser, thereby providing a rigid interface and lateral support means to said pump tip and extending said tube coupling above said tube locator recess whereby said pump tip is not susceptible to lateral displacement during operation of said dispenser and said pump tube does not extend downward into said tube locator recess when attached to said tube coupling, said body further comprising keyed surfaces corresponding to mating surfaces in said tube locator recess, said keyed surfaces and said mating surfaces cooperating to provide resistance to twisting and upward movement of said pump tip when said pump tip is engaged with said tube locator recess, said external mating surface having a generally cylindrical shape, said keyed surfaces comprising at least one tab extending outward from said body corresponding to at least one mating slot in said tube locator recess and further comprising at least one step surface on said body corresponding to at least one mating step surface in said tube locator recess.

2. An improved fluid container for use in a fluid dispenser, said fluid container comprising a pump tube connected to lower end of a fluid vessel such that fluid contained therein flows freely from said vessel into said pump tube, and further comprising a pump tip attached to lower end of said pump tube, said pump tip comprising a body, a nozzle projecting downward from lower end of said body, and a tube coupling projecting upward from upper end of said body by which said pump tube is attached thereto, said body containing an interior chamber, said chamber communicating with an output opening at lower end of said nozzle and further communicating with an input opening at upper end of said tube coupling whereby a continuous passage is formed through said pump tip, said body having at least one longitudinally-extending external mating surface, said mating surface directly engagable and closely fitting within a lower tube locator recess of said fluid dispenser, thereby providing a rigid interface and lateral support means to said pump tip while said tube coupling extends above said tube locator recess whereby said pump tube does not extend downward into said tube locator recess when attached to said tube coupling and said pump tip is not susceptible to lateral displacement during operation of said dispenser, said body further comprising keyed surfaces corresponding to mating surfaces in said tube locator recess, said keyed surfaces and said mating surfaces cooperating to provide resistance to twisting and upward movement of said pump tip when said pump tip is engaged with said tube locator recess, said external mating surface having a generally cylindrical shape, said keyed surfaces comprising at least one tab extending outward from said body corresponding to at least one mating slot in said tube locator recess and further comprising at least one step surface on said body corresponding to at least one mating step surface in said tube locator recess.

3. An improved fluid dispenser system comprising a dispenser and a fluid container for use therein, said fluid container comprising a pump tube connected to lower end of a fluid vessel such that fluid contained therein flows freely from said vessel into said pump tube, and further comprising a pump tip attached to lower end of said pump tube, said pump tip comprising a body, a nozzle projecting downward from lower end of said body, and a tube coupling projecting upward from upper end of said body by which said pump tube is attached thereto, said body containing an interior chamber, said chamber communicating with an output opening at lower end of said nozzle and further communicating with an input opening at upper end of said tube coupling whereby a continuous passage is formed through said pump tip, said body having at least one longitudinally-extending external mating surface, said mating surface directly engagable and closely fitting within a lower tube locator recess of said dispenser, thereby providing a rigid interface and lateral support means to said pump tip while said tube coupling extends above said tube locator recess whereby said pump tube does not extend downward into said tube locator recess when attached to said tube coupling and said pump tip is not susceptible to lateral displacement during operation of said dispenser, said body further comprising keyed surfaces corresponding to mating surfaces in said tube locator recess, said keyed surfaces and said mating surfaces cooperating to provide resistance to twisting and upward movement of said pump tip when said pump tip is engaged with said tube locator recess, said external mating surface having a generally cylindrical shape, said keyed surfaces comprising at least one tab extending outward from said body corresponding to at least one mating slot in said tube locator recess and further comprising at least one step surface on said body corresponding to at least one mating step surface in said tube locator recess.

* * * * *